3,523,919
PROCESS FOR THE PREPARATION OF HEAT-HARDENED INTERNALLY PLASTICIZED EPOXIDE RESINS
Erwin Weinrich, Dusseldorf-Holthausen, Germany, assignor to Hendel & Cie, G.m.b.H., Dusseldorf-Holthausen, Germany, a corporation of Germany
No Drawing. Filed Nov. 16, 1967, Ser. No. 683,442
Claims priority, application Germany, Nov. 30, 1966,
H 61,139
Int. Cl. C08g 30/12
U.S. Cl. 260—18          7 Claims

ABSTRACT OF THE DISCLOSURE

This invention relates to a process for the preparation of an internally plasticized hardened epoxide resin having increased flexibility without a substantial effect on its thermal properties which comprises the steps of reacting (1) a hardenable epoxide compound containing more than one epoxide group in the molecule with (2) an acid anhydride mixture consisting of from 50% to 95% by weight of an organic polycarboxylic acid anhydride epoxide hardener and from 5% to 50% by weight of an epoxidized acid anhydride selected from the group consisting of epoxidized unsaturated fatty acid anhydrides having from 8 to 26 carbon atoms in the fatty acid moiety, epoxidized anhydrides of unsaturated fatty acids having 8 to 26 carbon atoms in the fatty acid moiety, epoxidized cycloalkene monocarboxylic acid anhydrides having from 6 to 8 carbon atoms in the cycloalkene monocarboxylic acid moiety and epoxidized alkyl cycloalkene monocarboxylic acid anhydrides having from 7 to 12 carbon atoms in the alkylcycloalkene monocarboxylic acid moiety, under epoxide resin hardening conditions, and recovering said internally plasticized hardened epoxide resin.

THE PRIOR ART

Hardened epoxide resins, based on hardenable organic compounds containing more than one epoxide group in the molecule and hardened with organic polycarboxylic acid anhydrides, possess, as a rule, a relatively high resistance to deformation by heat. However, with regard to many purposes of application, the mechanical properties of these resins, manifested, for example, in their impact strength and flexural strength, leave much to be desired. In the field of plastic resins, it is a generally known practice to change the elastic properties of the hardened products by an addition of plasticizing agents. The employment of "external plasticizers" as, for example, the various phthalic acid esters ordinarily cannot be utilized with hardened epoxide resins due to their tendency toward exudation and because of the unfavorable changes of other resin properties caused by them, for example, their resistance to solvents. More favorable results can be obtained with the so-called "internal plasticizers" which are securely bonded into the resin structure, such as aliphatic carboxylic acid anhydrides containing long-chain alkyl radicals, for example, octenyl- or dodecenyl-succinic acid anhydride, polyazelaic acid polyanhydride or polysebacic acid polyanhydride. However, if these known internal plasticizers are utilized for the preparation of more flexible epoxide resins, obtained by hardening compounds containing more than one epoxide group in the molecule with organic dicarboxylic acid anhydrides or polycarboxylic acid anhydrides, the resistance to deformation by heat of the products declines sharply on relatively small additions of the "internal plasticizer" without, to a considerable measure, obtaining an essential improvement in the elastic properties of the resin.

OBJECTS OF THE INVENTION

An object of the invention is to effect a flexibilization of epoxide resins heat-hardened with carboxylic acid anhydrides, while changing the other properties of the product the least possible degree.

A further object of the invention is to develop a process for the preparation of an internally plasticized hardened epoxide resin having increased flexibility without a substantial effect on its thermal properties which comprises the steps of reacting (1) a hardenable epoxide compound containing more than one epoxide group in the molecule with (2) an acid anhydride mixture consisting of from 50% to 95% by weight of an organic polycarboxylic acid anhydride epoxide hardener and from 5% to 50% by weight of an epoxidized acid anhydride selected from the group consisting of epoxidized unsaturated fatty acid anhydrides having from 8 to 26 carbon atoms in the fatty acid moiety, epoxidized anhydrides of dimers of unsaturated fatty acids having 8 to 26 carbon atoms in the fatty acid moiety, epoxidized cycloalkene monocarboxylic acid anhydrides having from 6 to 8 carbon atoms in the cycloalkene monocarboxylic acid moiety and epoxidized alkyl cycloalkene monocarboxylic acid anhydrides having from 7 to 12 carbon atoms in the alkylcycloalkene monocarboxylic acid moiety, under epoxide resin hardening conditions, and recovering said internally plasticized hardened epoxide resin.

Another object of the invention is the production of a hardened epoxide resin, based on the reaction of a hardenable epoxide compound containing more than one epoxide group in the molecule with an organic polycarboxylic acid anhydride epoxide hardener, having both increased flexibility and good thermal properties.

These and other objects of the invention will become more apparent as the description thereof proceeds.

DESCRIPTION OF THE INVENTION

These objects of the invention can be achieved in the hardening of hardenable epoxide compounds containing more than one epoxide group in the molecule with an organic polycarboxylic acid anhydride epoxide hardener in that a portion of the organic carboxylic acid anhydrides added consists of epoxidized unsaturated fatty acid anhydrides having from 8 to 26 carbon atoms in the fatty acid moiety or their dimerization products.

As flexibilizing additions, the anhyrides of epoxidized unsaturated fatty acids and fatty acid mixtures having from 8 to 26 carbon atoms in the fatty acid moiety are utilized. The unsaturated fatty acids, which are preferably olefinically unsaturated and are subsequently epoxidized in their double bonds and converted to acid anhydrides, are, for example: 2-octenoic acid, 9-nonenoic acid, nonylenic acid, $\beta,\gamma$-decylenic acid, undecylenic acid, 2-hexadecenoic acid, physetoleic acid, oleic acid, elaidic acid, doeglic acid, gadoleic acid, erucic acid, brassidic acid, geranic acid, linoleic acid, eleostearic acid, linolenic acid; mixtures of unsaturated fatty acids, as they are obtained from natural oils, for example, soybean oil, peanut oil, coconut oil, corn oil, cottonseed oil, poppyseed oil, and linseed oil. In the case of the utilization of mixtures of unsaturated acids obtained from natural oils, the epoxidized acid anhydrides of fatty acid mixtures, due to the composition of the starting oils, contains a portion of non-epoxidized saturated fatty acid anhydrides. Furthermore, epoxidized acid anhydrides, based on dimerization of the above unsaturated fatty acids, can be employed.

Also considered are: epoxidized acid anhydrides of cycloalkene monocarboxylic acids having from 6 to 8 carbon atoms and alkylcycloalkene monocarboxylic acids having from 7 to 12 carbon atoms, such as cyclopentene-(1)-carboxylic acid-(1), cyclohexene-(1)-carboxylic acid-(1), cyclohexene-(2)-carboxylic acid-(1), cyclohexene-(3)-carboxylic acid-(1), 2-methyl-cyclohexene-(4)-carboxylic acid-(1), cycloheptene-(2)-carboxylic acid-(1).

The preparation of the epoxidized fatty acid anhydrides is carried out according to well known methods, for example, by the reaction of the unsaturated fatty acid anhydride in an inert solvent with peracetic acid. Other methods known to those skilled in the art may also be employed.

The usual anhydrides of organic polycarboxylic acids can be employed as acid anhydride epoxide hardeners, for example, maleic acid anhydride, chloromaleic acid anhydride, glutaric acid anhydride, succinic acid anhydride, phthalic acid anhydride, tetrahydrophthalic acid acid anhydride, hexahydrophthalic acid anhydride, methylhexahydrophthalic acid anhydride, endomethylenetetrahydrophthalic acid anhydride, methylendomethylenetetrahydrophthalic acid anhydride, methylcyclohexanedicarboxylic acid anhydride, etc.

As a rule, the amount of the organic polycarboxylic acid anhydride epoxide hardener to be used as hardener with the mixture of the hardenable epoxide compound and the flexibilizing addition shall be measured so that 0.6 to 1.2, preferably 0.8 to 0.9, polycarboxylic acid anhydride groups are present in the hardenable mixture for each epoxide group, including the epoxide groups originating from the epoxidized unsaturated carboxylic acid anhydride. The portion of the epoxidized unsaturated carboxylic acid anhydride in the total amount of the carboxylic acid anhydrides employed in the process is from 5% to 50%, preferably 10% to 30%. It is adjusted depending on the properties of the hardenable epoxide compound containing more than one epoxide group in the molecule.

As hardenable epoxide compounds containing more than one epoxide group in the molecule, for example, glycidyl ethers of polyhydric phenols, cycloaliphatic epoxide compounds and triglycidyl isocyanurate can be used. Suitable glycidyl ethers of polyhydric phenols are, for example, diglycidyl ethers of dihydric phenols such as the glycidyl ether of diphenylolpropane (Bisphenol A) with an epoxide equivalent of 170 to about 4,000, the glycidyl ether of chlorinated, brominated or methylated diphenylolpropane as well as the glycidyl ether of hydroquinone or resorcinol. The epoxide equivalent of these latter epoxide compounds is preferably between 170 and 1,200. As cycloaliphatic epoxide compounds having more than one epoxide group in the molecule are, for example, those which contain two epoxidized cyclohexene radicals in the molecule, such as 3,4-epoxy-hexahydro-6-methyl-tetrahydrobenzyl 3',4'-epoxy-6'-methylhexahydrobenzoate or the diepoxide of the acetal of cyclohexene aldehyde and 1,1-dimethylolcyclohexene. In the case that triglycidyl isocyanurate is employed as an epoxide compound containing several epoxide groups in the molecule, this should preferably be crystalline and have an epoxide oxygen content of at least 14%.

Furthermore, as hardenable epoxide compounds containing several epoxide groups in the molecule, modified glycidyl isocyanurates can be utilized. By means of modification of triglycidyl isocyanurate, products with a low melting point and usually a better compatibility with the other components are obtained. Thus, the modified glycidyl isocyanurates to be used according to the invention can be prepared by reacting triglycidyl isocyanurate with mono- or di-hydric phenols and/or thiophenols. In this case, about 1.5 to 6 phenolic hydroxyl groups or mercapto groups are employed for each 30 epoxide groups of the triglycidyl isocyanurate (10 mols of triglycidyl isocyanurate).

A further method for the modification of triglycidyl isocyanurate consists in reacting it with mono or polycarboxylic acids or epoxidized carboxylic acids. Here, about 1 to 10 carboxyl groups are allotted to each 30 epoxide groups of the triglycidyl isocyanurate. Also triglycidyl isocyanurates modified with monovalent amines, preferably mono-amino-benzene and substituted benzenes, such as aniline or substituted aniline, can be employed.

Especially favorable is the flexibilizing effect of the epoxy fatty acid anhydrides used according to the invention on epoxide resinous compounds based on glycidyl ethers of diphenylolpropane having an epoxide equivalent of 170 to 1,200. The products prepared from these substances evidence, besides a good flexibility, the least decline in the resistance to deformation by heat.

The hardening of the reaction mixtures is carried out in the usual manner at temperautres of 80° to 250° C., particularly 100° to 200° C., over a period of from about 1 to 20 hours, in particular, from 2 to 8 hours. In most cases, the formation of the hardened epoxide resin is completed after this period of time. However, to be absolutely sure that the hardening process is complete, it is advisable to temper the molded bodies intended for test purposes for an additional time at elevated temperatures of, for example, 150° to 200° C.

In well known manner, dyes or fillers can be added to the mixtures prepared according to the invention, such as, for example, metallic powder, quartz powder, glass powder, glass fibers, mica, aluminum oxide, titanium oxide, ground dolomite or barium sulfate.

The mixtures to be reacted according to the invention can be easily obtained by melting together the epoxide compound containing several epoxide groups in the molecule with the organic polycarboxylic acid anhydride employed as the hardening agent and with the epoxidized acid anhydride employed for the flexibilizing effect. In the case where the epoxide compound containing several epoxide groups is in liquid form, then stable liquid combinations can be prepared, if so desired. With high molecular starting substances, as mostly used for the preparation of coatings, the components can be combined in suitable solvents or in mixtures of solvents. The solvent-free combinations evidence on hardening only an insignificant shrinkage and, consequently, they are particularly suitable as casting and laminating resins. By means of heating, due to the low melting points of the epoxidized acid anhydrides of unsaturated fatty acids, especially low viscosity mixtures are obtainable which, for example, permit the incorporation of a large amount of filler.

The following examples will serve for better comprehension of the invention. However, they do not limit the scope of the invention in any manner.

As epoxidized fatty acid anhydrides with flexibilizing effect (flexibilizers), the following compounds were used in the examples.

(I) 9,10-epoxy-stearic acid anhydride, $C_{36}H_{66}O_5$. The product was prepared following the usual methods. 500 gm. of oleic acid anhydride were admixed with 2 liters of chloroform in a reaction vessel equipped with a stirrer. Next, 1250 ml. of 6.2% peracetic acid were poured slowly into the reaction mixture, while maintaining the temperature at 20° to 25° C. After the reaction mixture had been stirred for several hours, the mixture was worked up in the uusal manner, thus obtaining the desired 9,10-epoxy-stearic acid anhydride with a yield of pure product of 70%. The other epoxidized fatty acid anhydrides were prepared in the same manner.

(II) 10,11-epoxy-undecane acid anhydride, $C_{22}H_{38}O_5$, obtained by epoxidation of undecylenic acid anhydride.

(III) Mixture of epoxidized fatty acid anhydrides, prepared from a mixture of oleic acid enriched with the fatty acids from beef tallow.

(IV) Mixture of 50% epoxidized oleic acid anhydride and 50% of epoxidized linoleic acid anhydride, obtained by epoxidizing the fatty acid mixture obtained by saponification of cotton seed oil and enrichment of the unsaturated components.

(V) Mixture of 26% epoxidized oleic acid anhydride, 45% of epoxidized linoleic acid anhydride, 10% of epoxidized linolenic acid anhydride and 19% of saturated high-molecular-weight fatty acid anhydrides, obtained by epoxidizing of the fatty acid mixture obtained by saponification of soybean oil and enrichment of the unsaturated components.

(VI) Epoxidized erucic acid anhydride, $C_{44}H_{82}O_5$, obtained by epoxidizing erucic acid anhydride.

(VII) Epoxidized anhydride of dimerized oleic acid.

(VIII) Epoxidized anhydride of 3-cyclohexene-carboxylic acid-(1).

In the following examples, hexahydrophthalic acid anhydride (HHPA) and methylhexahydrophthalic acid anhydride (MHHPA) were employed as organic polycarboxylic acid anhydride epoxide hardeners. Serving as polymerizable compounds containing several epoxide groups in the molecule, used in the examples were two low-molecular-weight glycidyl-ethers of diphenylolpropane with the commercial designations: "GFT 0164" (epoxide equivalent, 186) and "Araldit B" (epoxide equivalent, 396), as well as a crystalline triglycidyl isocyanurate with an epoxide-oxygen content of 15.3% (TGI), prepared according to Example 3 of French Pat. No. 1,451,424.

EXAMPLES

For the execution of the tests, mixtures were prepared by melting the previously mentioned starting substances together in the amounts given in the respective tables, and molded bodies, measuring 10 x 15 x 120 mm., were cast therefrom. These molded bodies were hardened for 3 hours at a temperature of 160° C. in the mold. Following this hardening period, the molded bodies were removed from the mold and additionally tempered over a period of 20 hours to obtain the final properties. The tempering was conducted at a temperature of 150° C. for the resins based on glycidyl ethers of diphenylolpropane, and at a temperature of 200° C. for the resins based on triglycidyl isocyanurate. The results of these examples are given in the following tables. The columns, regarding the properties of the resins obtained, indicate: Martens temperature, impact strength, deflection and flexural strength. The tests for these properties were conducted according to the following DIN procedures: DIN 53,458; DIN 53,453; DIN 53,452.

TABLE I

| Mixture components in parts by weight | Martens temp., °C. | Impact strength kp.cm./cm.$^2$ | Deflection, mm. | Flexural strength kp./cm.$^2$ |
|---|---|---|---|---|
| 100 "GFT 0164," 75 HHPA | 108 | 20 | 11 | 1,140 |
| 100 "GFT 0164," 82 HHPA, 9.2 Flexibilizer II | 98 | 35 | 14 | 1,350 |
| 100 "GFT 0164," 89 HHPA, 18.4 Flexibilizer II | 89 | 39 | 16 | 1,470 |
| 100 "GFT 0164," 82 HHPA, 9.2 Flexibilizer I | 97 | 24 | 12 | 1,230 |
| 100 "GFT 0164," 89 HHPA, 18.4 Flexibilizer I | 89 | 28 | 14 | 1,430 |
| 100 "GFT 0164," 76 HHPA, 16 Flexibilizer III | 85 | 24 | 13 | 1,220 |
| 100 "GFT 0164," 76 HHPA, 16 Flexibilizer IV | 94 | 31 | 14 | 1,320 |
| 100 "GFT 0164," 76 HHPA, 16 Flexibilizer V | 97 | 28 | 14 | 1,290 |
| 100 "GFT 0164," 76 HHPA, 16 Flexibilizer VI | 83 | 29 | 13 | 1,280 |

TABLE II

| Mixture components in parts by weight | Martens temp., °C. | Impact strength kp.cm./cm.$^2$ | Deflection, mm. | Flexural strength kp./cm.$^2$ |
|---|---|---|---|---|
| 100 "GFT 0164," 75 MHHPA | 110 | 20 | 11 | 1,100 |
| 100 "GFT 0164," 82 MHHPA, 9.2 Flexibilizer II | 98 | 27 | 13 | 1,300 |
| 100 "GFT 0164," 89 MHHPA, 18.4 Flexibilizer II | 88 | 39 | 18 | 1,480 |
| 100 "GFT 0164," 82 MHHPA, 9.2 Flexibilizer I | 106 | 26 | 13 | 1,260 |
| 100 "GFT 0164," 89 MHHPA, 18.4 Flexibilizer I | 94 | 32 | 16 | 1,480 |
| 100 "GFT 0164," 76 MHHPA, 16 Flexibilizer III | 90 | 25 | 12 | 1,320 |
| 100 "GFT 0164", 76 MHHPA, 16 Flexibilizer IV | 94 | 26 | 14 | 1,340 |
| 100 "GFT 0164," 76 MHHPA, 16 Flexibilizer V | 95 | 24 | 13 | 1,280 |
| 100 "GFT 0164," 76 MHHPA, 16 Flexibilizer VI | 91 | 30 | 14 | 1,390 |

TABLE III

| Mixture components in parts by weight | Martens temp., °C. | Impact strength kp.cm./cm.$^2$ | Deflection, mm. | Flexural strength kp./cm.$^2$ |
|---|---|---|---|---|
| 100 "Araldit B," 36 HHPA | 99 | 25 | 14 | 1,250 |
| 100 "Araldit B," 40 HHPA, 8.5 Flexibilizer II | 91 | 32 | 17 | 1,450 |
| 100 "Araldit B," 40 HHPA, 8.5 Flexibilizer I | 92 | 28 | 16 | 1,480 |
| 100 "Araldit B," 40 HHPA, 16 Flexibilizer III | 88 | 35 | 15 | 1,390 |
| 100 "Araldit B," 40 HHPA, 16 Flexibilizer IV | 91 | 33 | 18 | 1,410 |
| 100 "Araldit B," 40 HHPA, 16 Flexibilizer V | 90 | 32 | 18 | 1,450 |
| 100 "Araldit B," 40 HHPA, 16 Flexibilizer VI | 82 | 36 | 19 | 1,470 |

TABLE IV

| Mixture components in parts by weight | Martens temp., °C. | Impact strength kp.cm./cm.$^2$ | Deflection, mm. | Flexural strength kp./cm.$^2$ |
|---|---|---|---|---|
| 100 "Araldit B," 36 MHHPA | 97 | 25 | 12 | 1,200 |
| 100 "Araldit B," 40 MHHPA, 8.5 Flexibilizer II | 83 | 31 | 15 | 1,370 |
| 100 "Araldit B," 40 MHHPA, 8.5 Flexibilizer I | 81 | 28 | 19 | 1,420 |
| 100 "Araldit B," 40 MHHPA, 16 Flexibilizer III | 79 | 29 | 16 | 1,410 |
| 100 "Araldit B," 40 MHHPA, 16 Flexibilizer IV | 81 | 32 | 14 | 1,390 |
| 100 "Araldit B," 40 MHHPA, 16 Flexibilizer V | 83 | 34 | 17 | 1,430 |
| 100 "Araldit B," 40 MHHPA, 16 Flexibilizer VI | 87 | 30 | 17 | 1,440 |

TABLE V

| Mixture components in parts by weight | Martens temp., °C. | Impact strength kp.cm./cm.$^2$ | Deflection, mm. | Flexural strength kp./cm.$^2$ |
|---|---|---|---|---|
| 100 TGI, 140 HHPA | 221 | 13 | 4 | 710 |
| 100 TGI 126 HHPA, 14 Flexibilizer II | 190 | 16 | 6 | 910 |
| 100 TGI, 126 HHPA, 16.5 Flexibilizer I | 197 | 14 | 5 | 770 |
| 100 TGI, 112 HHPA, 28 Flexibilizer II | 137 | 19 | 8 | 1,130 |
| 100 TGI, 140 HHPA, 25 Flexibilizer VII | 168 | 15 | 8 | 980 |
| 100 TGI, 150 HHPA, 40 Flexibilizer VIII | 139 | 19 | 9 | 1,120 |
| 100 TGI, 130 HHPA, 25 Flexibilizer VIII | 177 | 24 | 9 | 1,340 |

From the above tables, it can be ascertained that the molded bodies prepared by the process of the invention have superior mechanical properties without undue loss of the good thermal properties as compared with hardened bodies prepared without the internal plasticizer of the invention. In addition to molded bodies prepared by the process of the invention, it is also possible by the same process to prepare coatings and adhesive bonds which have the same improved properties.

The preceding specific embodiments are illustrative of the process of the invention. It is to be understood, however, that other expedients known to those skilled in the art can be employed without departing from the spirit of the invention or the scope of the appended claims.

I claim:
1. A process for the preparation of an internally plasticized hardened epoxide resin having increased flexibility without a substantial effect on its thermal properties which comprises the steps of reacting (1) a hardenable epoxide compound containing more than one epoxide group in the molecule with (2) an acid anhydride mixture consisting of from 50% to 95% by weight of an organic polycarboxylic acid anhydride epoxide hardener and from 5% to 50% by weight of an epoxidized acid anhydride selected from the group consisting of epoxidized unsaturated fatty acid anhydrides having from 8 to 26 carbon atoms in the fatty acid moiety, epoxidized anhydrides of dimers of unsaturated fatty acids having 8 to 26 carbon atoms, epoxidized cycloalkene monocarboxylic acid anhydrides having from 6 to 8 carbon atoms in the cycloalkene monocarboxylic acid moiety and epoxidized alkyl cycloalkene monocarboxylic acid anhydrides having from 7 to 12 carbon atoms in the alkylcycloalkene monocarboxlic acid moiety, under epoxide resin hardening conditions, and recovering said internally plasticized hardened epoxide resin.

2. The process of claim 1 wherein said hardenable epoxide compound containing more than one epoxide group in the molecule is a glycidyl ether of diphenylolpropane having an epoxide equivalent of from 170 to about 1200.

3. The process of claim 1 wherein said acid anhydride mixture consists of from 70% to 90% by weight of said organic polycarboxylic acid anhydride epoxide hardener and from 10% to 30% by weight of said epoxidized acid anhydride.

4. The process of claim 1 wherein the amount of said organic polycarboxylic acid anhydride epoxide hardener is chosen so that from 0.6 to 1.2 carboxylic acid anhydride groups in said organic polycarboxylic acid anhydride are present for each epoxide group in said hardenable epoxide compound and in said epoxidized acid anhydride.

5. The process of claim 4 wherein 0.8 to 0.9 carboxylic acid anhydride groups are present for each epoxide group.

6. The hardened internally plasticized epoxide resin having increased flexibility without a substantial effect on its thermal properties produced by the process of claim 1.

7. The process of claim 1 wherein said epoxidized acid anhydride is an epoxidized unsaturated fatty acid anhydride having from 8 to 26 carbon atoms in the fatty acid moiety.

References Cited

UNITED STATES PATENTS

| | | | |
|---|---|---|---|
| 3,371,070 | 2/1968 | Chang et al. | 260—78.4 |
| 3,222,381 | 12/1965 | Iacoviello et al. | 260—348 X |
| 3,002,950 | 10/1961 | Shull | 260—348 X |

DONALD E. CZAJA, Primary Examiner

C. WARREN IVY, Assistant Examiner

U.S. Cl. X.R.

260—830, 47, 78.4, 2